United States Patent [19]

Donnelly

[11] 4,067,313

[45] Jan. 10, 1978

[54] EXOTHERMIC COMPOSITION AND HOT PACK

[75] Inventor: William R. Donnelly, Piqua, Ohio

[73] Assignee: Readi Temp, Inc., Piqua, Ohio

[21] Appl. No.: 748,167

[22] Filed: Dec. 7, 1976

[51] Int. Cl.² ............................................. F24J 1/02
[52] U.S. Cl. ................................. 126/263; 44/3 A; 206/219; 252/70; 252/188.3 R
[58] Field of Search ................ 126/263; 44/3 R, 3 A, 44/3 B; 252/188.3 R, 70; 206/219, 498; 62/4, 530; 128/403

[56] References Cited

U.S. PATENT DOCUMENTS

| 2,261,221 | 11/1941 | Bruner ................................ 126/263 |
| 2,680,063 | 6/1954 | Shapiro ............................... 126/263 |
| 3,328,136 | 6/1967 | Yerakas ............................... 126/263 |
| 3,461,073 | 8/1969 | Crowell et al. ....................... 126/263 |
| 3,475,239 | 10/1969 | Fearon et al. ................... 252/188.3 R |
| 3,702,302 | 11/1972 | Wilson ................................. 252/70 |
| 3,766,079 | 10/1973 | Jackman ........................ 252/188.3 R |
| 3,903,011 | 9/1975 | Donnelly ............................ 126/263 |
| 3,951,127 | 4/1976 | Watson et al. ....................... 126/263 |

Primary Examiner—Ronald C. Capossela
Attorney, Agent, or Firm—Jerome P. Bloom

[57] ABSTRACT

A particulate composition producing an exothermic reaction when mixed with water, and a hot pack containing such a composition, and water isolated therefrom until the intended time for use. The composition consists essentially of, in parts by weight, about 40 to about 90 parts anhydrous calcium chloride, about 12 to about 25 parts anhydrous sodium acetate, and about 5 to 15 parts calcium oxide. A hot pack, per the invention, comprises a sealed, impermeable, flexible outer enclosure containing the composition, and a sealed, impermeable, flexible, easily ruptured inner enclosure containing about 40 to about 90 parts by weight of water. The proportions of the elements of the particulate composition will vary somewhat in accordance with the objectives of the hot pack in which the composition is applied. When the contents of the hot pack are activated, it will gradually reach, maintain and be limited to be predetermined safe temperature. For example, in an embodiment particularly advantageous for use as a food warmer, this predetermined temperature will be about 107° C and will be maintained for a period of time up to 20 minutes. An embodiment applied as a food and hand warmer will, by contrast, gradually reach and maintain a temperature of about 84° C for a period up to 20 minutes and more. In any case the hot pack, when its contents are activated, will be placed in a condition that it is moldable to conform to the surface or surfaces to which it is applied.

The pack of the subject invention also features, in preferred embodiment, an improved construction for the inner enclosure designed to give highly controlled conditions and insurance as to the time the inner enclosure will rupture.

19 Claims, 3 Drawing Figures

U.S. Patent  Jan. 10, 1978  4,067,313
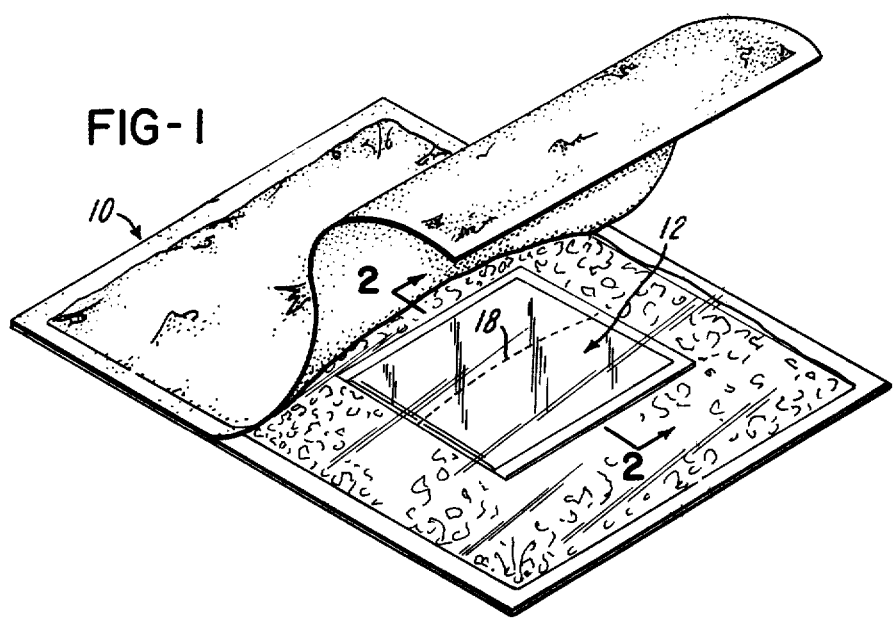
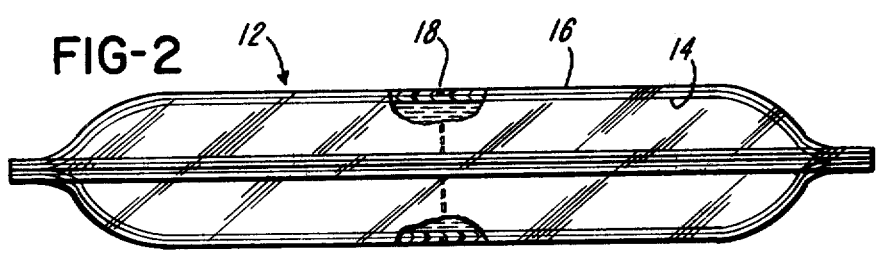
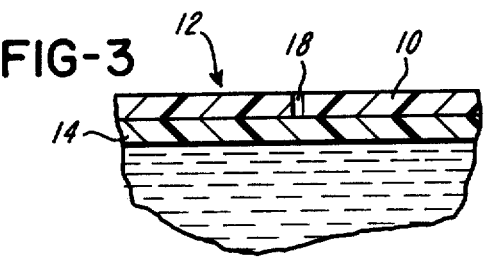

EXOTHERMIC COMPOSITION AND HOT PACK

BACKGROUND OF THE INVENTION

This invention relates to a composition which produces an exothermic reaction when mixed with water, and to a hot pack containing such a composition, and water isolated therefrom until the intended time for use. By way of illustration but not by way of limitation, particular advantageous embodiments may take the form of a therapeutic hot pack, a hand or foot warmer or a device for heating beverages or packaged or frozen foods. In any case, hot packs per this invention are characterized by an ability to mold and conform to the configuration of the surface to be heated and to provide such surface with an effective level of heat for a period of time up to about twenty minutes.

Compositions for producing an exothermic reaction are known in the prior art. U.S. Pat. No. 3,903,011, for example, discloses a composition producing an exothermic reaction which preferably consists of about 66.7% by weight anhydrous calcium chloride, about 16.7% calcium oxide, about 5.5% guar gum, and about 11.1% anhydrous borax (sodium tetraborate). This composition is activated by adding water in a weight ratio of about 0.55:1 to about 1:1 of water to the dry composition.

The composition of the noted patent must be prepared in a form in which the guar gum and borax encapsulate the calcium oxide and calcium chloride. Upon addition of water, agitation is needed in order to cause the guar gum and borax to form a gel which tends to extend the duration of the exothermic reaction up to about 15 minutes and prevent an extremely rapid temperature rise.

Although the composition of the above mentioned patent has utility in limited applications, a need still exists for a sealed, flexible hot pack providing a moldable structure which readily conforms to the contours of the surfaces to be heated, and wherein the exothermic reaction can be initiated without agitation or mixing to create a gel. To the best of applicant's knowledge no prior art composition or package intended for heating provides such a function which is at the same time completely safe in use and which provides relatively uniform heat over an extended period of time up to about 20 minutes.

SUMMARY

It is a principal object of the present invention to provide a composition and hot pack which meets the need set forth above.

A composition in accordance with the invention consists essentially of, in parts by weight, about 40 to about 90 parts anhydrous calcium chloride, about 12 parts to about 25 parts anhydrous sodium acetate, and about 5 parts to about 15 parts calcium oxide. This composition forms a moldable gel when mixed with about 40 to about 90 parts by weight water, which may be at ambient temperature, and will reach a temperature of about 65° C about 10 seconds after addition of water, followed by a gradual increase in temperature to a level not in excess of about 107° C within about 10 minutes, which temperature will be maintained uniform for about another 20 minutes.

A hot pack in accordance with the invention comprises a sealed, flexible, impermeable, water insoluble outer enclosure having high resistance against puncture, rupture and abrasion; a sealed, flexible, impermeable, water insoluble inner enclosure having low resistance against puncture and rupture, the inner enclosure being of smaller size than the outer enclosure and being disposed therewithin; the outer enclosure containing a particulate composition which produces an exothermic reaction when mixed with water, the composition consisting essentially of, in parts by weight, about 40 to about 90 parts anhydrous calcium chloride, about 12 parts to about 25 parts anhydrous sodium acetate, and about 5 parts to about 15 parts calcium oxide; and the inner enclosure containing about 40 to about 90 parts by weight water. Upon rupture of the inner enclosure to cause mixing between the composition and water, an exothermic reaction starts, a moldable gel forms, and the moldable mass gradually reaches a temperature not in excess of about 107° C and maintains this temperature for about 20 minutes.

An additional object of the present invention is to provide for use in the hot pack of the invention a highly advantageous bag-like inner enclosure formed of a sheet structure, of plastic film or its equivalent comprised of plural sheets bonded to and coextensively with each other, the one sheet to form the inner wall of the enclosure being imperforate and the sheet to form the outer wall of the enclosure having a line of perforations to define thereby a predetermined line of weakness in the bonded sheet structure, which line in the folding and creation of the bag-like enclosure is presented on the outer surface of the end product.

Referring to the accompanying drawings, wherein one but not necessarily the only form of embodiment of a preferred package construction in accordance with the invention is illustrated, FIG. 1 is a perspective view of a hot pack demonstrating the position and nature of its inner enclosure constructed in accordance with the present invention;

FIG. 2 is a side view of the inner enclosure demonstrating the nature and character of its multi-ply wall structure; and FIG. 3 is a fragmentary view further illustrating the detail of said wall structure.

DESCRIPTION OF THE PREFERRED EMBODIMENTS

A preferred composition which exhibits an optimum combination of properties particularly advantageous for use in a hot pack for warming food consists essentially of, in parts by weight, about 70 parts anhydrous calcium chloride, about 15 parts anhydrous sodium acetate and about 10 parts calcium oxide. Preferably about 65 parts by weight of water are added to this preferred composition in order to initiate the exothermic reaction.

The particle size of the ingredients of the composition is not critical. Calcium chloride is commercially available in the form of prills and such prills are entirely satisfactory for use in the present composition. Anhydrous sodium acetate and calcium oxide are ordinarily available in the form of finely divided powder and are entirely satisfactory in this form.

The outer enclosure of the hot pack of the invention can be made of any of a variety of resin films or sheets having the above described properties, and polyethylene or polyvinyl chloride have been found to be entirely suitable. The thickness of the film should be selected so as to resist penetration, rupture or abrasion under any ordinarily encountered conditions of storage and/or use. Optimally, in forming a hot pack having particular utility as a food warmer utilizing the preferred composition in the proportions above described, its outer enclosure should have a volume such as may be derived by superposing two identical rectangular 5 inch by 8 inch sheets of film and sealing together their peripheral edges.

The inner enclosure may be a film of the same or different resin and should be of a much thinner guage in order that it will rupture upon application of a predetermined pressure to the surface of the package.

In assembly of the hot pack the particulate ingredients of the composition may be introduced in admixture into the outer enclosure. However, for optimum performance and extended storage life, it is preferred that the calcium oxide be separately enclosed in a porous bag such as an envelope of kraft type paper or waxed paper, so that it is initially isolated from the calcium chloride and sodium acetate as well as the water in the inner enclosure. The water is introduced into the inner enclosure, and this is sealed. The inner enclosure is then nested within the outer enclosure, and the outer enclosure is sealed. Heat sealing is effective for both enclosures when a resin film such as polyethylene or polyvinyl chloride is used. A preferred outer enclosure also includes a layer of metallic foil sealed to the outer surface of the outer enclosure in order to provide greater efficiency in heat transfer.

Should a heat pack of the invention embody the preferred particulate composition, noted as particularly suited for use in warming food or other inanimate objects, be used as a hand or foot warmer or for therapeutic purposes, it will be understood that some type of insulating layer should be provided between the skin and the pack in order to avoid direct exposure to the maximum temperature of about 170° C.

When it is desired to use the hot pack of the invention, it can simply be placed on a firm backing surface and pressed or struck on its outer surface in order to rupture the inner enclosure containing the water, thus starting the exothermic reaction.

A portion of the water immediately starts to dissolve the calcium chloride prills with a resultant initial production of heat up to about 65° C. A portion of the anhydrous sodium acetate is also believed to dissolve initially in the water, but the exothermic effect of such solution is relatively minor and by itself would raise the temperature only to about 45° C. The rapid exothermic reaction of the calcium chloride with water raises the entire contents of the pack to about 65° C in about 10 seconds. By this time the anhydrous sodium acetate has dissolved to an extent that a gel forms, and this gel surrounds and coats the partially dissolved calcium chloride prills present in the mixture. The coating of the prills by the gel delays and makes more gradual the complete dissolution thereof by the water, thereby producing a gradual and continued liberation of heat, which reaches a temperature of about 107° C in about 10 minutes.

In the preferred embodiment described above, wherein the calcium oxide is isolated from the remaining ingredients, water does not penetrate the paper envelope until the temperature of the entire pack exceeds 65° C and approaches about 90° C. By the time the latter temperature is approached the water will have penetrated the kraft paper envelope, or melted the wax of the waxed paper envelope and passed therethrough, fully to react with the calcium oxide. This reaction produces considerable heat since calcium oxide liberates about 15,500 calories of heat per gram molecular weight when reacted with water to form calcium hydroxide, This delayed evolution of further heat by the calcium oxide component provides an added heat factor at a point to critically reinforce the delayed heat evolving action of the calcium chloride prills now coated with the sodium acetate gel. As a result, there is a prolonged heating effect, with a maximum uniform temperature of about 107° C being reached and maintained for about 20 minutes, after which the temperature of the pack will be gradually reduced until it reached the ambient temperature.

Although not wishing to be bound by theory or by the precise nature of the chemical reactions which may occur, tests have indicated that the components of the invention composition mutually interact in the manner described above.

It is thus evident that each of the components, and the control of the proportion thereof, is essential to producing a safe and uniform heat over an extended period of time and in achieving a hot pack which can mold itself to conform to configuration of the surfaces being heated, thereby insuring optimal heat transfer.

The gelling effect provided by anhydrous sodium acetate is obtained when at least about 12 parts by weight are present. This effect is not achieved by use of the hydrated form of sodium acetate, which exists in the form of monoclinic crystals containing three molecules of water of crystallization.

Since anhydrous sodium acetate does not contribute substantially to the exothermic reaction, it should not exceed about 25 parts by weight relative to the proportions of other components present.

The initial production of heat and maintenance thereof for at least several minutes are the function of the anhydrous calcium chloride, and for this purpose at least about 40 parts by weight of the anhydrous calcium chloride are essential, and preferably 65 parts where the composition is to be used for such applications as a food warmer. However, the calcium chloride should not exceed about 90 parts by weight in order to avoid formation of a saturated aqueous solution thereof before the water present in the pack has had an opportunity to react with the calcium oxide.

Calcium oxide must be present in an amount sufficient to continue and enhance the initial heating effect contributed by the calcium chloride. For this reason at least about 5 parts by weight of calcium oxide are essential and a maximum of about 15 parts by weight should be observed in order to avoid a possible temperature rise above about 107° C.

Finally, enough water must be present to react with all the compounds which produce the exothermic reaction. However, an excess of water would decrease the gelling effect of the anhydrous sodium acetate, delay the rise in temperature and limit the maximum temperature which can be attained. Hence a range of about 40 to about 90 parts by weight of water should be observed.

The gelling effect provided by the anhydrous sodium acetate has several desirable functions or results. Since it makes the heat pack of the invention moldable and pliable, it insures efficient and direct transfer of the heat developed to the surfaces to which the pack is applied. The gel also prolongs or delays the rate of dissolution of the calcium chloride, as described above, and thus effects heat retention to a degree not previously accomplished in prior art compositions. Moreover, the gel is formed in situ without the necessity for agitation or stirring of the composition in the water.

The gelling effect which occurs causes an expansion of the mass, but this exansion is not sufficient to exert undue pressure on the outer enclosure. In relatively uniformly maintaining the evolved temperature at a level of about 107° C only a relatively small amount of steam is generated. Hence the steam pressure does not exert undue pressure on the outer enclosure, thus contributing to the safety of the hot pack of this invention, in contrast to prior compositions wherein a maximum temperature of about 115° to about 120° C is attained.

Another form of a preferred composition of the invention which is particularly advantageous for use in a hot pack for therapeutic purposes, such as one serving as a hand or foot warmer, consists essentially of, in parts by weight, about 45 parts anhydrous calcium chloride, about 45 parts anhydrous sodium acetate and from 5 to about 15 parts calcium oxide. Preferably to this particulate composition about 45 parts by weight water are added in order to initiate the exothermic action.

As far as the particle size and nature of the dry ingredients of the composition, the same remarks here apply as were made in reference to the first described preferred composition. The outer and inner enclosure will be of the same character, the only difference being as to their size, the optimal size of the sheets of film forming the outer enclosure being in this instance 5 inches by 5 inches. p One follows the same procedure as previously described, or its equivalent, to rupture the inner enclosure containing the water, thus starting the required exothermic reaction. As in the first case, a portion of the water immediately starts to dissolve the calcium chloride prills to initially produce heat up to 65° C. Again, a portion of the anhydrous sodium acetate will dissolved initially in the water but without particularly affecting the initial production of heat for reasons previously mentioned. By the time 10 seconds have elapsed the exothermic reaction of the calcium chloride with water raised the contents of the pack to about 65° C. Moreover, by this point in time the anhydrous soldium acetate has dissolved to an extent that a gel forms and fully surrounds and coats those calcium chloride prills which have only partially dissolved. The coating of the prills by this particular gel produces a delay factor in the dissolving of the enveloped portions of the calcium chloride prills, the latter of which are required to draw water from the gel and in the process to evolve heat. The arrangement is such that the evolution of heat is gradual and continuous. The proportions of the elements involved will in about 10 minutes cause the hot pack to reach a temperature of about 80° to 84° C. Contributing to the level of heat achieved in 10 minutes is the calcium oxide, which starts its material evolution of heat when the temperature of the pack and its contents have reached a temperature level somewhat in excess of 65° C. The calcium oxide will combine with water and function in a manner similar to that described with reference to the preferred embodiment first set forth. The only material difference in this case is that by proportioning the constituents of the composition and the amount of water added to the reduced amounts set forth there results the evolution, after the first 10 minutes of interaction of the constituents of the composition, of heat producing a maximum generally uniform temperature of the hot pack and its contents at a level in the neighborhood of 84° C. This level will be maintained in this case for a period of about 20 minutes and even more before the temperature of the pack is gradually reduced, over an extended period of time, until it reaches the ambient temperature. In the case of this embodiment as in the first described embodiment the use thereof has been found to produce a pliable moldable package which can be contoured to the surface of the portion of a body to which the same is applied and to uniformly apply heat thereto at a safe level for an extended period of time. As noted previously, this ability to mold and contour to a surface together with the other features described enables one to get a maximum therapeutic effect in use of the invention embodiments.

It is thus evident that the composition and hot pack of the present invention accomplish the principal objectives above set forth. Various modifications may be made without departing from the spirit and scope of the invention. For example, while the hot pack has been described as having the particulate composition in the outer enclosure with the water sealed in the inner enclosure, this positioning could be reversed with the water in the outer enclosure. The preferred arrangement, however, is with the water in the inner enclosure and with the calcium oxide in a paper envelope, since this facilitates rupture of the inner enclosure, a uniform and rapid contact of the water with all the calcium chloride prills and the anhydrous sodium acetate, and an optimally timed reaction of the calcium oxide.

A particularly preferred form of the hot pack of the present invention will be characterized by a bag-like inner enclosure 12 formed of plastic film, for example polyethylene sheet material or its equivalent, so composed as to insure rupture thereof at a particular level of applied pressure. In preferred embodiment the sheet material employed will consist of one imperforate sheet 14 to form the inner wall of the enclosure having bonded thereto a second sheet 16 of a similar nature distinguished, however, by a transverse line of fine perforations 18 which present themselves as part of the outer wall of the enclosure. As thus provided, the transverse line of perforations 18 will define a weakened area of the bag-like enclosure 12. By way of example and not by way of limitation, for the purposes herein described the sheet material will have a thickness of about 0.001 inches giving the wall structure of the enclosure a optimal thickness of 0.002 inches. This optimal thickness may in some cases be effected by differentiating the thickness of the respective sheet segments bonded together. In forming a bag-like inner enclosure of this multi-ply sheet material, it will first be cut to a predetermined size to fit the application and then folded on itself on a central line extending perpendicular to the line of perforations 18 in the outer sheet portion of the bonded material. After folding, the superposed peripheral edge portions of the half sections of the bonded sheet material will be aligned and sealed together. Of course one side of the bag so formed will be left open until such time as the material to be contained by the bag, in this case water, is introduced.

With a bag-like inner enclosure 12 so designed one has a structure which will resist ready rupture in the case of an inadvertent blow or impact. However, when one applies to such a bag filled with water, for example, a steady predetermined reasonable amount of pressure, applied through the outer enclosure 10, those areas of the sheet material of the bag 12 which include in the outer bonded sheet portion 16 thereof the line of fine perforations 18 will rupture. Moreover the rupture will occur substantially under the same conditions of applied pressure in each embodiment of the bag-like inner enclosure here described.

In the utilization of this preferred construction for the inner bag-like enclosure one can depend on the fact that each embodiment utilizing the same thickness of its wall structure will satisfactorily function under the same conditions. This insures security and a relatively safe condition of a hot pack per the invention prior to the time of intended use and enables one to have a controlled condition under which the bag-like inner enclosure will rupture to deliver its contents to intermix with the particulate composition with which it is embodied in the outer enclosure of the hot pack per the invention. The utilization of this construction for the inner bag-like enclosure thus enhances the desirability of the herein described invention embodiments for general use.

The construction of the bag-like enclosure for use in a hot pack such as provided by the present invention will have equal beneficial results when utilized in a hot pack having a particulate compositions other than herein described or even in connection with a particulate composition in a cold pack wherein the contents of the inner bag-like enclosure and its outer enclosure will be such that they are designed to produce an endothermic reaction.

It will be understood that the arrangement of the perforations and the means and manner in which they are embodied, as herein described, is preferred. However, there may be modification thereof within the spirit and scope of the present invention which will be obvious to those versed in the art.

The embodiments of the invention in which an exclusive property or privilege is claimed are defined as follows:

1. A composition producing an exothermic reaction over an extended period of time when mixed with water, consisting essentially of, in parts by weight, about 40 to about 90 parts anhydrous calcium chloride, about 12 to about 25 parts anhydrous sodium acetate, and about 5 to about 15 parts calcium oxide, said composition forming a moldable gel upon mixing with about 40 to about 90 parts by weight of water at ambient temperature and maintaining a temperature not in excess of about 107° C for a period of time up to about 20 minutes.

2. The composition claimed in claim 1, consisting essentially of, in parts by weight, about 70 parts anhydrous calcium chloride, about 15 parts anhydrous sodium acetate, and about 10 parts calcium oxide.

3. The composition claimed in claim 1, consisting essentially of, in parts by weight, about 45 parts anhydrous calcium chloride, about 15 parts anhydrous sodium acetate, and from 5 to about 10 parts calcium oxide.

4. A hot pack adapted to conform to the contours of surfaces to which it is applied, comprising a sealed, flexible, impermeable, water insoluble outer enclosure having high resistance against puncture, rupture and abrasion; a sealed, flexible, impermeable, water insoluble inner enclosure having low resistance against puncture and rupture, said inner enclosure being of smaller size than said outer enclosure and being disposed therewithin; said outer enclosure containing a particulate composition producing an exothermic reaction when mixed with water, said composition consisting essentially of, in parts by weight, about 40 to about 90 parts anhydrous calcium chloride, about 12 to about 25 parts anhydrous sodium acetate, and about 5 to about 15 parts calcium oxide, said inner enclosure containing about 40 to about 90 parts by weight water, whereby rupture of said inner enclosure causes said water to contact said composition and produce an exothermic reaction and a gelling of the contents into a moldable mass.

5. The hot pack claimed in claim 4, wherein said calcium oxide is enclosed in a porous envelope within said outer enclosure, whereby to isolate said calcium oxide from initial contact with said water upon rupture of said inner enclosure.

6. The hot pack claimed in claim 4, wherein said particulate composition consists essentially of, in parts by weight, about 70 parts anhydrous calcium chloride, about 15 parts anhydrous sodium acetate, and about 10 parts calcium oxide, and wherein about 65 parts by weight water are provided in said inner enclosure.

7. The hot pack claimed in claim 4, wherein said particulate composition consists essentially of, in parts by weight, about 45 parts anhydrous calcium chloride, about 15 parts anhydrous sodium acetate, and from 5 to about 10 parts calcium oxide, and wherein about 45 parts by weight water are provided in said inner enclosure.

8. The hot pack claimed in claim 6, wherein said exothermic reaction gradually raises the temperature of said moldable mass to about 107° C in about 10 minutes, and maintains said temperature for a period of time up to about 20 minutes.

9. The hot pack claimed in claim 7, wherein said exothermic reaction gradually raises the temperature of said moldable mass to about 84° C in about 10 minutes, and maintains said temperature for a period of time up to about 20 minutes.

10. The hot pack claimed in claim 6 wherein said outer enclosure is formed to have a volumetric capacity equal to one provided by two relatively superposed generally rectangular approximately 5 inch × 8 inch sheets which are secured together at their peripheral edges.

11. The hot pack claimed in claim 7, wherein said outer enclosure is formed to have a volumetric capacity equal to one provided by two relatively superposed generally rectangular approximately 5 inch × 5 inch sheets which are secured together at their peripheral edges.

12. A hot pack as in claim 4 characterized in that said inner enclosure is formed, as to its wall structure, of a multi-ply sheet composition the sheet elements of which are bonded one to the other, the inner sheet portion being imperforate and the outer sheet portion including therein means defining a weakened area thereof to provide thereby for controlled conditions under which such inner enclosure will rupture.

13. A hot pack as in claim 4 wherein said inner enclosure has a bag-like construction, its wall structure is formed of a plurality of sheet elements bonded together and to include therein means defining a weakened line extending across an outer face of said wall structure.

14. A hot pack as in claim 13 wherein said means defining a weakened line is in generally circumferentially extending relation to said enclosure.

15. A heat transfer pack adapted to conform to the contours of surfaces to which it is applied, comprising a sealed, flexible, impermeable, water insoluble outer enclosure having high resistance against puncture, rupture and abrasion; a sealed, flexible, impermeable, water insoluble inner enclosure having low resistance against puncture and rupture, said inner enclosure being of smaller size than said outer enclosure and being disposed therewithin; one of said enclosures containing a particulate composition which produces a heat transfer reaction when mixed with water, the other of said enclosures containing water for producing said heat transfer reaction, said inner enclosure being characterized by a wall structure comprised of a plurality of sheets of film-like material bonded one to the other, the inner of said sheets being impermeable and an outer thereof being modified to produce a weakened area of said wall structure arranged to provide for controlled conditions under which said inner enclosure will rupture under the influence of applied pressure to release said water to contact said particulate composition and produce thereby a heat transfer reaction with respect to the surface to which said outer enclosure is applied.

16. A heat transfer pack as in claim 15 wherein said weakened area of said wall structure has a line form.

17. A heat transfer pack as in claim 16 wherein said weakened area of said wall structure is provided by a line of perforations in said outer of said sheets thereof.

18. A heat transfer pack as in claim 15 wherein said weakened area of said wall structure extends about and in a sense circumferentially of the outer surface thereof and resists rupture until subjected to a predetermined level of applied pressure.

19. A heat transfer pack as in claim 15 wherein said weakened area of said wall structure is defined by a series of perforations extending circumferentially of and formed in the outer sheet portion of said wall structure, which perforations are so arranged as to generally uniformly predetermine the level of pressure at which said inner enclosure will rupture.

* * * * *